Jameson & Chamberlain,
Horseshoe.

N° 84,745.   Patented Dec. 8, 1868.

Witnesses;
Gustave Dietrich
Wm A Morgan

Inventors;
R. G. Jameson
W. H. Chamberlain
for Munn & Co
Attorneys

ROBERT G. JAMESON AND WILLIAM H. CHAMBERLAIN, OF BRISTOL, NEW HAMPSHIRE.

Letters Patent No. 84,745, dated December 8, 1868.

IMPROVEMENT IN HORSE-SHOES.

The Schedule referred to in these Letters Patent and making part of the same.

*To all whom it may concern:*

Be it known that we, ROBERT G. JAMESON and WILLIAM H. CHAMBERLAIN, of Bristol, in the county of Grafton, and State of New Hampshire, have invented a new and useful Improvement in Horse-Shoes; and we do hereby declare that the following is a full, clear, and exact description thereof, which will enable those skilled in the art to make and use the same, reference being had to the accompanying drawings, forming part of this specification.

This invention relates to a new and improved method of constructing horse-shoes, whereby they are rendered much more useful than horse-shoes made in the ordinary manner; and It consists in forming a curved bar, with the calks formed on it, and attaching it to the shoe, as will be hereinafter more fully described.

Similar letters of reference indicate corresponding parts.

Figure 1:
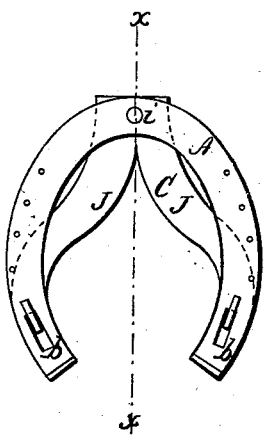
Figure 1 represents a horse-shoe constructed according to our invention.

A is the shoe, which is nailed to the hoof of the horse in the ordinary manner.

This shoe has two slot-holes through it, as seen in the drawing at $b\ b$, the side shown in the drawing being that which goes next the hoof.

C is the bar which is attached to the shoe.

Figure 2:
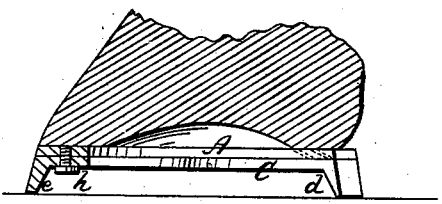
Figure 2 is a vertical section through the line $x\ x$.

The calks are formed on this bar, as seen in section, fig. 2, where $d$ represents one of the rear or heel-calks, and $e$, the toe-calk.

The bar C is fastened to the shoe A by the hooks $f\ g$, on the bar, which pass through the slots $b\ b$, and hook under the shoe, as seen in the drawing.

When the hooks are thus passed through the plate, the bar is drawn forward, so that it can be fastened to the shoe by a single screw, $h$, passing through the hole $i$.

The slots through the plate A are made inclined or wedging on their under sides, and the hook is made to fit, as seen in fig. 2, so that the side of the shoe which goes next to the foot is smooth, as represented.

For the purpose of protecting the hoof of the horse, the bar C is curved inward, as seen at J J, on each side of the "frog" of the hoof, which prevents stones wedging in between the frog and the shoe, and also prevents the hoof from "balling" with snow.

It will be seen that, by taking out the single screw $h$, the bar with the calks can be removed, for sharpening the calks, without in any manner disturbing the shoe A.

The advantages of this arrangement are many, and must be obvious to all.

We claim as new, and desire to secure by Letters Patent—

The bar C, of the form herein shown, and provided with heel and toe-calks, when fastened to the shoe by means of the hooks $f\ f$ and slots $b\ b$ at the heel, and screw $i$ at the toe, substantially as described for the purpose specified.

The above specification of our invention signed by us, this 20th day of October, 1868.

ROBERT G. JAMESON.
    WM. H. CHAMBERLAIN.

Witnesses:
 S. K. MASON,
 ALBERT BLAKE.